ALBERT L. GAINES
GEORGE A. RUTLEDGE
RONALD B. CREEK
INVENTORs.

BY Robert L. Olson
ATTORNEY

May 7, 1968   A. L. GAINES ET AL   3,381,951
INSULATING ARRANGEMENT TO PROTECT THE TRUNNION RING
AND WALLS OF A BASIC OXYGEN VESSEL
Filed Oct. 12, 1965   4 Sheets-Sheet 3

ALBERT L. GAINES
GEORGE A. RUTLEDGE
RONALD B. CREEK
INVENTORS.

BY Robert L. Olson
ATTORNEY

BRICK 40
VESSEL WALL 42
INSULATING SHIELD 50
INSULATING SHIELD 52
TRUNNION RING WALL 44
TRUNNION RING WALL 45
INSULATING SHIELD 54
INSULATING SHIELD 56

BRICK 40
VESSEL WALL 42
INSULATING SHIELD 58
INSULATING SHIELD 60

ALBERT L. GAINES
GEORGE A. RUTLEDGE
RONALD B. CREEK
*INVENTORs.*

BY Robert L. Olson

ATTORNEY

United States Patent Office 3,381,951
Patented May 7, 1968

3,381,951
INSULATING ARRANGEMENT TO PROTECT THE TRUNNION RING AND WALLS OF A BASIC OXYGEN VESSEL
Albert L. Gaines, Signal Mountain, and George A. Rutledge and Ronald B. Creek, Chattanooga, Tenn., assignors to Combustion Engineering Inc., Windsor, Conn., a corporation of Delaware
Filed Oct. 12, 1965, Ser. No. 495,285
5 Claims. (Cl. 266—36)

ABSTRACT OF THE DISCLOSURE

Insulating shields for protecting the trunnion ring of a tiltably mounted furnace vessel, and also for protecting the upper wall portion of the vessel itself, from thermal stress damage. Cylindrical shields positioned intermediate the vessel and trunnion ring prevent the buildup of undue thermal stresses caused by heat radiation from the vessel. Shields are also positioned adjacent the outer surface of the trunnion ring, and adjacent the upper wall portion of the vessel in the vicinity of the pouring opening, to prevent thermal stresses caused by heat radiation from the ladle car into which molten steel is being poured from the vessel.

---

This invention relates to tiltably mounted furnace vessels, for example basic oxygen furnaces, and in particular to means for preventing thermal stress damage thereto during operation.

In recent years, more and more steel is being produced by means of basic oxygen furnaces or converters. These furnaces consist of a large upright open ended vessel, mounted in a trunnion ring so as to be tiltable about a horizontal axis.

Steel is produced by introducing oxygen into the vessel filled with liquid metal and scrap iron, so as to burn out the impurities. After approximately one-half hour of oxygen treatment, the vessel is tilted so that the molten steel can be discharged through a pouring spout into a ladle car positioned below the vessel. The vessel is then uprighted and filled with liquid metal and scrap iron, and a new cycle begins. By using pure oxygen for the combustion, extremely high temperatures are attained within the vessel. Also, very large weights are involved. A vessel capable or turning out 200 tons of steel during one cycle will weigh 800–1000 tons when it is loaded with scrap metal. Because of the large weights and rapid cycling high temperatures involved, thermal stress problems have been encountered in the past because of temperature differentials.

It is an object of this invention to provide thermal or insulating shields to protect various portions of a furnace from being exposed to undue temperature differentials.

Other and further objects and advantages will become apparent from the following description of the illustrative embodiment of this invention when considered with the accompanying drawings, wherein.

Figure 1:
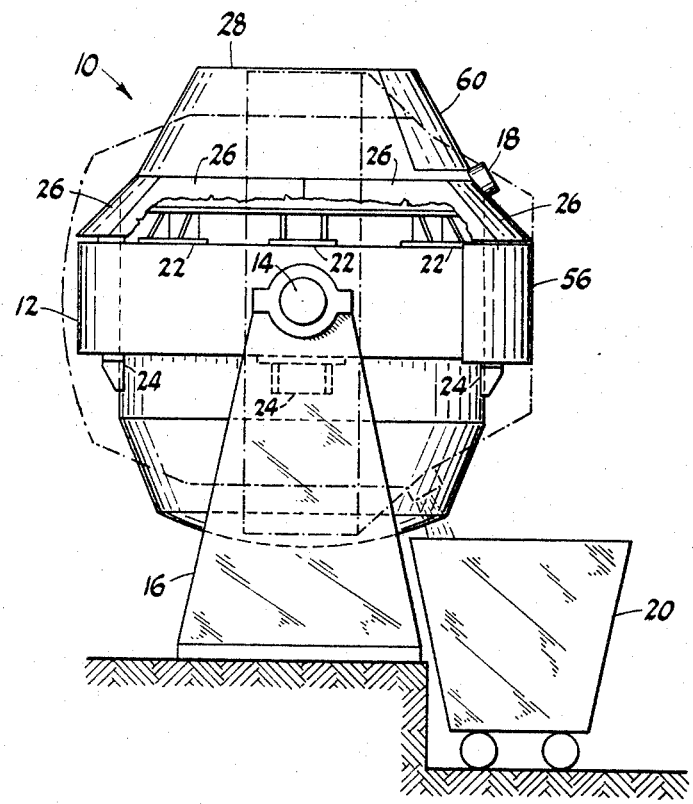
FIGURE 1 is a side elevational view of a furnace vessel arrangement in accordance with our invention.
Figure 2:
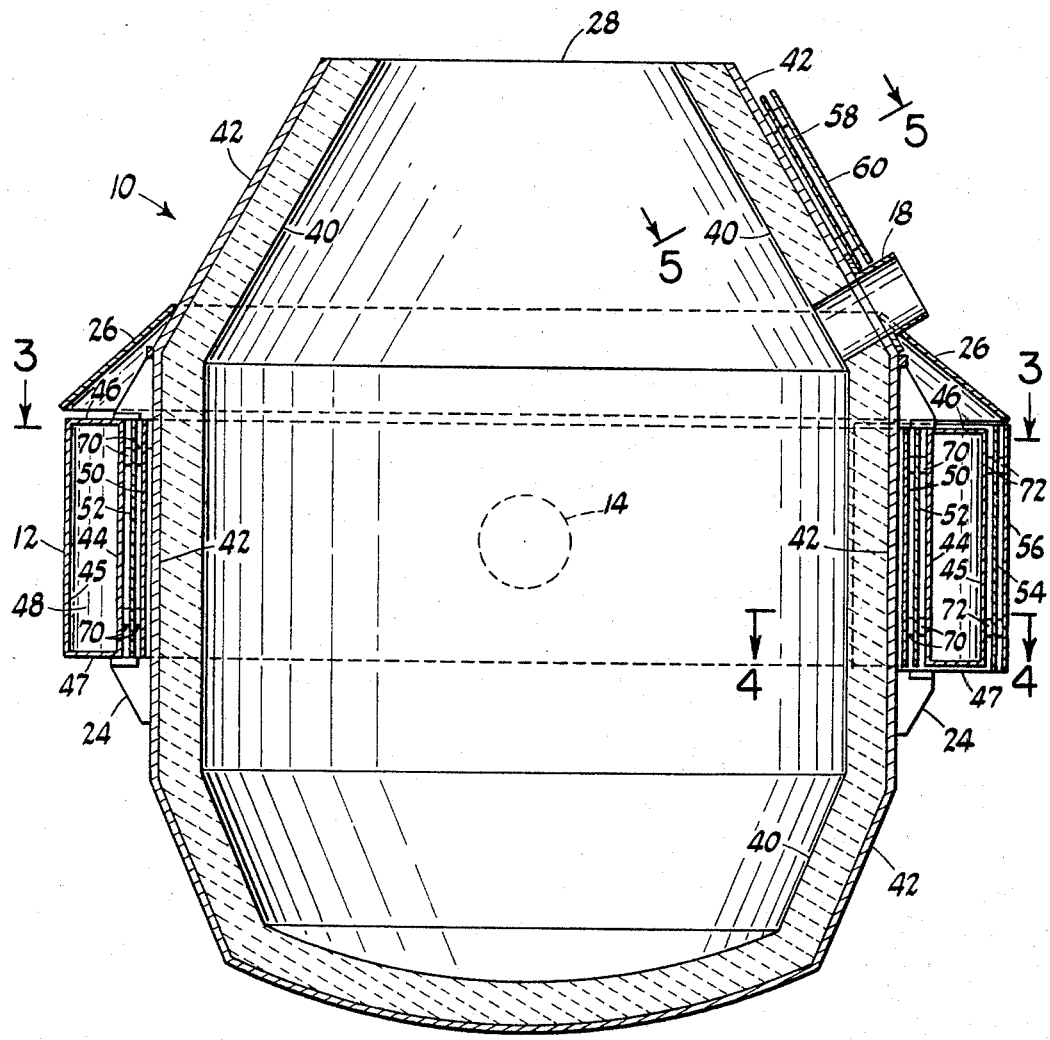
FIGURE 2 is a cross-sectional elevation view of the furnace vessel shown in FIGURE 1.

Looking now to FIGURES 1 and 2, illustrated in a basic oxygen furnace arrangement, consisting of a vessel 10, supported or mounted in a trunnion ring 12. Fixed to ring 12 are diametrically opposed trunnions or pins 14. These trunnions are rotatably supported by stanchions 16. Drive means (not shown) are provided for rotating the trunnion ring 12 and vessel 10 about the trunnion axis, when molten steel is to be discharged through pouring spout 18 into ladle car 20.

When vessel 10 is in the upright position, it is supported through upper brackets 22 by the trunnion ring. When the vessel is inverted, it is supported through lower brackets 24. Both brackets 22 and 24 are suitably secured to the vessel 10, such as by welding or bolting.

Figure 3:
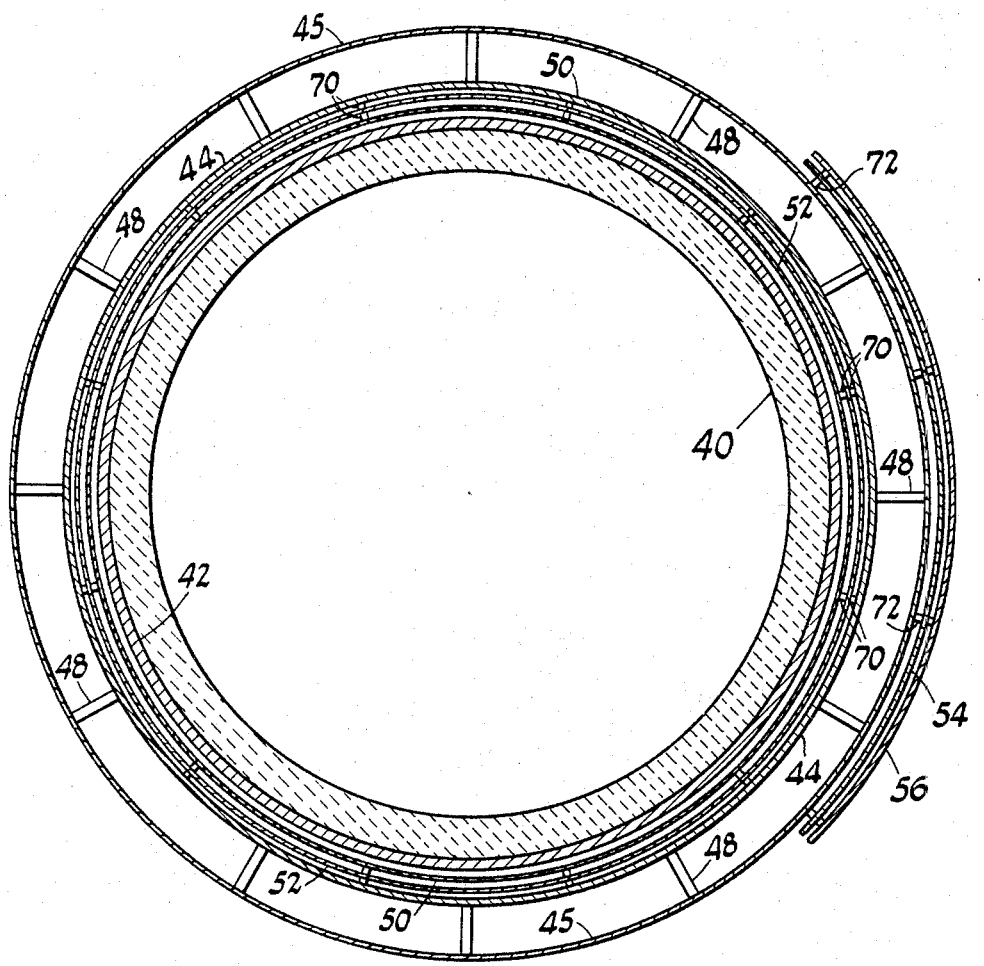
FIGURE 3 is a plan section taken on lines 3—3 of FIGURE 2.
Figure 4:
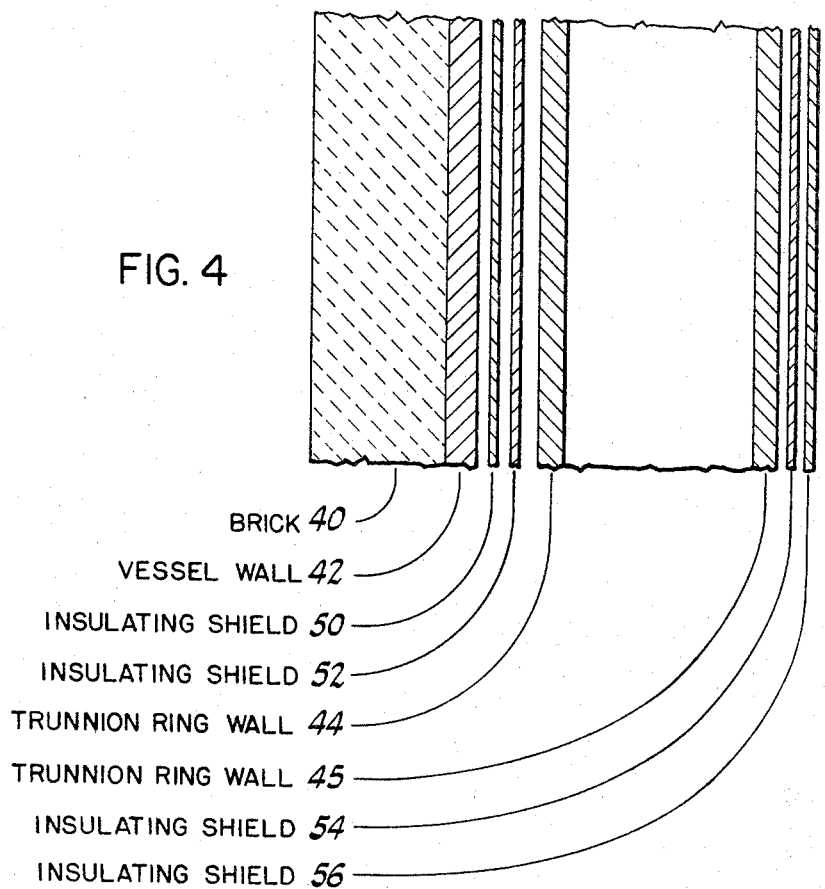
FIGURE 4 is an enlarged partial section taken on lines 4—4 of FIGURE 2.

As best shown in FIGURES 3 and 4, the inner surface 44 of the trunnion ring 12 is somewhat spaced from the outer surface of the vessel wall 42. This is to allow for radial expansion of the vessel during the operating life of a campaign. During the oxygen blowing portion of the cycle, a lance is inserted into the vessel 10 through upper opening 28. Pure oxygen is blown into the vessel through the lance, so as to burn out the impurities contained in the charge of liquid metal and scrap iron. Temperatures of approximately 5000° F. are attained during this time. Even with a substantial thickness of brick lining in the vessel, the outer surface of the vessel wall reaches a high temperature during the heating period. This heat will radiate to the inner wall of the trunnion ring, thereby developing a large temperature differential between the inner and outer trunnion ring walls, unless steps are taken to prevent it.

Temperature differential problems are also encountered during the pouring portion of the cycle. When the vessel has been rotated to its pouring position (broken line position as seen in FIGURE 1), the upper portion of the vessel adjacent the pouring spout, and also the outer surface of the trunnion ring closest to the ladle car, receives a considerable amount of radiant heat from the molten steel contained in the ladle car.

In accordance with our invention, steps have been taken to prevent the above mentioned thermal stress problems. As best seen in FIGURES 3 and 4, a pair or multiple of spaced apart cylindrical metal shields 50 and 52 are positioned between the vessel wall 42 and the inner trunnion ring wall 44. These shields are of the same height as the trunnion ring, and extend completely around the vessel, so as to prevent radiation of heat from the vessel to any portion of the inner trunnion ring wall. These shields are supported from the trunnion ring by means of small brackets or braces 70 (FIGURE 3).

Figure 5:
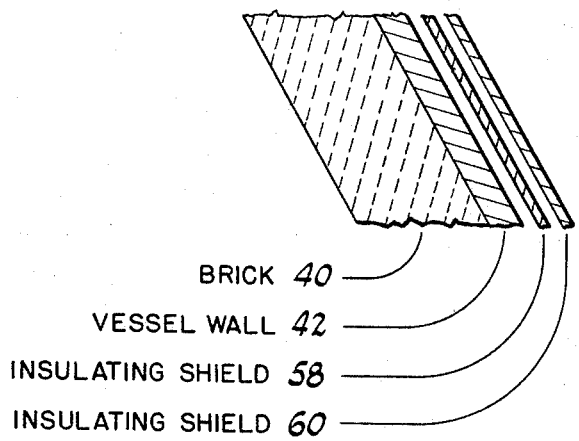
FIGURE 5 is an enlarged partial section taken on lines 5—5 of FIGURE 2.

Shielding plates 54 and 56, which are semi-cylindrical in shape, are secured to the outer trunnion ring wall 45 by means of braces 72. These plates are of the same height as the trunnion ring, and extend through approximately a 90° arc (FIGURE 3), directly adjacent to the ladle car. Secured to the upper portion of the vessel adjacent pouring spout 18 are shielding plates 58 and 60 (FIGURE 5). These plates extend through approximately a 90° arc, as do plates 54 and 56.

Because of the spacing of the shield members 50 and 52 from one another, and from vessel wall 42 and the inner trunnion ring wall 44, a natural "chimney effect" circulation of cooling air is effected. As the air in the annulus between the vessel wall and the trunnion ring heats up, it tends to rise, and escapes through the annular opening between the drip shield 26 and the upper trunnion ring wall. This flow of hot air draws cool air into this vacated space, thus establishing a natural air cooling system, which continuosly carries heat away. The same is true of the pairs of shields 54, 56, and 58, 60.

The temperature differentials which will exist with and without our inventive insulating shields has been determined for a typical unit. Consider first the shields positioned between the vessel and the inner wall of the trunnion ring. Without the shields, the outside vessel wall temperature will reach approximately 580° F. during the oxygen blowing cycle. The inside wall of the trunnion ring will be approximately 400° F., and the outside wall temperature 250° F. Thus a temperature differential of approximately 150° F. would exist between the inner wall and the outer wall of the trunnion ring. On an average sized unit being constructed today, where the inner diameter of the trunnion ring might be 25 feet, considerable damage, and even failure of the ring, could be caused by this temperature differential which occurs during each cycle of operation.

With the double shielding arrangement of our invention in place, the outer vessel wall temperature would be 580° F. The inner trunnion ring wall will be approximately 135° F., and the outer wall 80° F. This temperature differential of 55° F. is not sufficient to cause stress damage to the trunnion ring. In the above examples, the source of heat is the burning of combustible impurities from the molten metal within the vessel during the oxygen blowing portion of the cycle.

The above temperature conditions will exist under the most extreme operating conditions; i.e. when the brick lining of the vessel has worn away to the thinnest depth at which a vessel is allowed to operate. When a vessel is initially put into operation, the brick lining in a typical unit might be 3 feet in depth. After two or three weeks of operation, this will have worn away until it is only approximately 1 foot thick. At this time, the vessel is temporarily taken out of operation and rebricked.

Regarding the outer wall of the trunnion ring, during the pouring portion of the cycle, temperatures of approximately 625° F. will be reached on the outer wall surface without the shielding members. The inner wall temperature will be approximately 135° F. at this time. By utilizing the insulating shields, the temperature of both the inner and outer trunnion ring walls should be approximately 135° F.

The upper portion of the vessel adjacent the pouring spout can attain a surface temperature of over 1000° F. during the pour without any shielding means. With the shielding means, the surface temperature should not exceed 600° F. Since this is nearly the temperature of the other portions of the vessel wall, no great temperature differential exists when using the insulating shields. The above is based on an 8 foot average distance of the exposed members from the surface of the molten metal in the ladle car during a pour.

Although the outer trunnion ring wall and the upper portion of the vessel are exposed to heat radiation from a hotter source of radiation during the pour than the inner trunnion ring wall is during the oxygen blowing, the time of exposure is considerably less. The blowing cycle usually runs 30–40 minutes, whereas the complete pour cycle is generally 12–15 minutes. Thus it is difficult to say which cycle creates the greatest heat stress problem. It should be readily seen that the shielding arrangement of our invention provides adequate protection from heat stress during both cycles.

While the preferred embodiment of the invention has been shown and described, it will be understood that changes in construction, combination and arrangement of parts may be made without departing from the spirit and scope of the invention as claimed.

What we claim is:

1. In combination, a vessel for refining metals therein, opening means in the upper portion through which molten metal can be discharged, a trunnion ring completely surrounding and supporting the vessel, and insulating means for the trunnion ring for preventing the buildup of undue thermal stresses therein caused by heat radiation from the vessel, said insulating means being cylindrical shield means intermediate the vessel and trunnion ring, and slightly spaced from both the vessel and the trunnion ring, said cylindrical shield means extending from a point adjacent the bottom of the trunnion ring to a point adjacent the top of the trunnion ring.

2. In combination, a vessel for refining metals therein, opening means in the upper portion through which molten metal can be discharged, a trunnion ring completely surrounding and supporting the vessel, means for tilting the vessel so that molten metal can be gravity discharged through the opening means, ladle means positioned adjacent and slightly below the vessel, for holding the molten metal discharged from the vessel, first insulating means for protecting the trunnion ring from undue heat radiation originating from the vessel itself, and from the molten metal contained in the ladle means, and second insulating means positioned so as to protect the trunnion ring from heat radiation from the molten metal contained in the ladle means, said first insulating means being a cylindrical shield means intermediate the vessel and the trunnion ring, and slightly spaced from both the vessel and the trunnion ring, said second insulating means being a semi-cylindrical shield means slightly spaced from the outer surface of the trunnion ring, said semi-cylindrical shield means extending through approximately a 90° arc, both the cylindrical shield means and the semi-cylindrical shield means extending from a point adjacent the bottom of the trunnion ring to a point adjacent the top of the trunnion ring.

3. The combination set forth in claim 1, wherein said cylindrical shield means includes at least two spaced concentric cylindrical metal members.

4. The combination set forth in claim 2, wherein said first insulating means includes at least two spaced metal concentric cylindrical members, and said second insulating means includes at least two spaced metal semi-cylindrical members.

5. In combination, a vessel for refining metals therein, opening means in the upper portion through which molten metal can be discharged, a trunnion ring completely surrounding and supporting the vessel, means for tilting the vessel so that molten metal can be gravity discharged through the opening means, ladle means positioned adjacent and slightly below the vessel, for holding the molten metal discharged from the vessel, insulating means positioned so as to protect the trunnion ring from heat radiation from the molten metal contained in the ladle means, said insulating means being a semi-cylindrical shield means slightly spaced from the outer surface of the trunnion ring, the semi-cylindrical shield means extending from a point adjacent the bottom of the trunnion ring to a point adjacent the top of the trunnion ring, said shield means extending through approximtaely a 90° arc.

References Cited

UNITED STATES PATENTS

| 3,193,272 | 7/1965 | Kramer et al. | 266—36 |
| 3,201,108 | 8/1965 | Kramer | 266—36 |
| 3,313,619 | 4/1967 | Decamps | 266—36 X |

FOREIGN PATENTS

| 1,229,257 | 9/1960 | France. |
| 337,880 | 6/1921 | Germany. |

J. SPENCER OVERHOLSER, *Primary Examiner.*

E. MAR, *Assistant Examiner.*